United States Patent [19]

Biedebach

[11] 4,153,132

[45] May 8, 1979

[54] TRAILER STEERING AND TOWING HITCH

[76] Inventor: Lawrence W. Biedebach, 2225 Primrose St., Vista, Calif. 92083

[21] Appl. No.: 825,573

[22] Filed: Aug. 18, 1977

[51] Int. Cl.² .............................................. B62D 5/06
[52] U.S. Cl. .................................... 180/136; 280/468; 280/DIG. 9; 280/DIG. 14
[58] Field of Search ................................ 180/136, 134; 280/DIG. 9, DIG. 14, 468, 462, 490 R, 490 A, 469, 463, 479 R, 495

[56] References Cited

U.S. PATENT DOCUMENTS

| 2,653,031 | 9/1953 | Butler | 280/DIG. 9 |
| 2,922,660 | 1/1960 | Haugland et al. | 280/468 |

FOREIGN PATENT DOCUMENTS

| 395756 | 12/1965 | Switzerland | 280/DIG. 9 |
| 619744 | 3/1949 | United Kingdom | 280/468 |
| 878485 | 10/1961 | United Kingdom | 180/134 |

Primary Examiner—John A. Pekar
Attorney, Agent, or Firm—Brown & Martin

[57] ABSTRACT

A trailer steering and towing hitch includes a moveable hitch connecting member which is supported on a towing vehicle for moving back and forth transverse to the axis of the towing vehicle with a motor for moving the hitch member back and forth for moving the front of a towed trailer for shifting and steering the trailer.

2 Claims, 5 Drawing Figures

TRAILER STEERING AND TOWING HITCH

BACKGROUND OF THE INVENTION

The present invention relates to vehicle towing hitches and pertains particularly to a steering towing hitch.

When a trailer or other towed vehicle is towed behind a towing vehicle, it is sometimes necessary to maneuver the vehicle into parking spaces and the like. The maneuverability of such vehicles is very difficult especially in confined places. When backing the towed vehicle into a position, it is necessary to maneuver the towing vehicle through a considerable degree of turning in order to steer the trailer or other towed vehicle. Frequently insufficient space exists for the necessary maneuverability of the towing vehicle.

Accordingly, it is desirable that some means be available for assisting in the steering of a towed vehicle when being maneuvered behind a towing vehicle.

SUMMARY AND OBJECTS OF THE INVENTION

Accordingly it is the primary object of the present invention to overcome the above problems of the prior art.

Another object of the present invention is to provide a steerable hitch for mounting on a towing vehicle for steering a towed vehicle.

In accordance with the primary aspect of the present invention a steerable towing hitch includes a movable hitching means that is mounted for movement transverse to the axis of the towing vehicle with power means controllable from a remote position such as for the operator of the vehicle to move the towing hitch means in order to assist the maneuvering and steering the towed vehicle.

BRIEF DESCRIPTION OF THE DRAWINGS

The above and other objects and advantages of the present invention will become apparent from the following description when read in conjunction with the drawings, wherein.

DETAILED DESCRIPTION OF A PREFERRED EMBODIMENT

Figure 1:
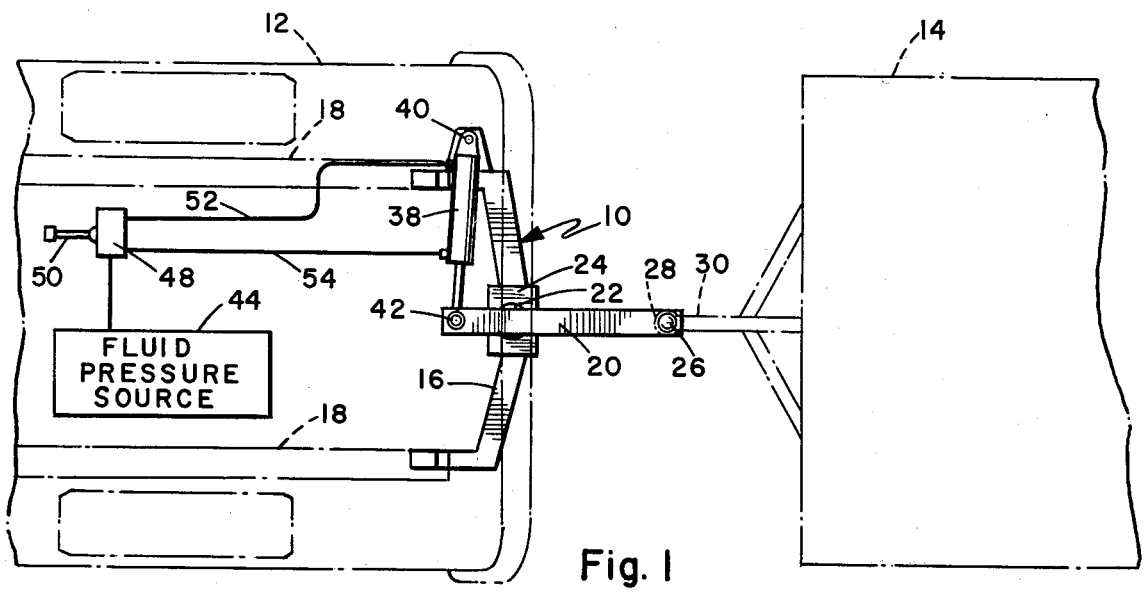
FIG. 1 is a top plan view of the trailer steering towing hitch coupling a vehicle and trailer.
Figure 2:
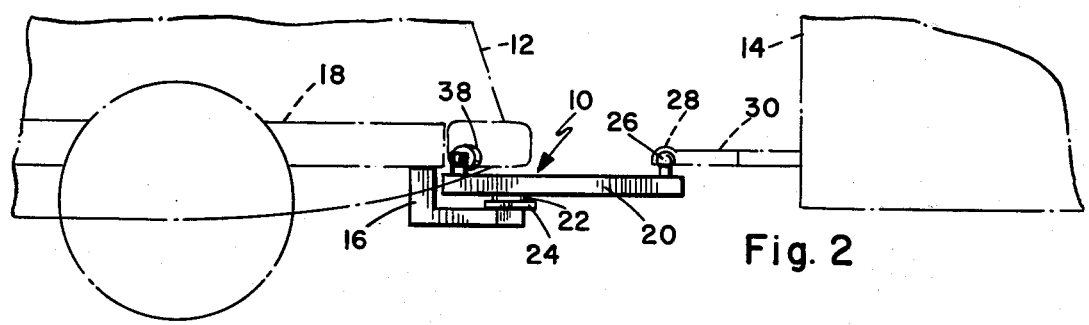
FIG. 2 is a side elevational view of the structure of FIG. 1.
Figure 3:
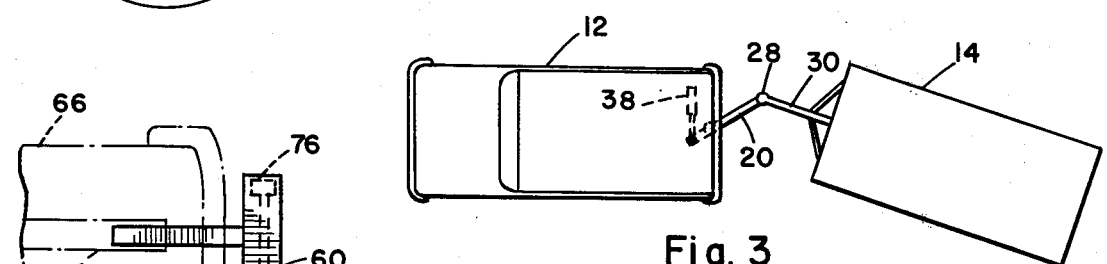
FIG. 3 illustrates the trailer steering action.

Turning now to FIG. 1 of the drawing, there is illustrated a hitch assembly in accordance with the present invention designated generally by the numeral 10 mounted on a towing vehicle designated generally by the numeral 12 for towing a trailer or similar vehicle designated generally by the numeral 14. The steering towing hitch assembly, as illustrated in FIGS. 1 through 3, includes a support frame structure 16 for attachment to the towing vehicle. This frame support structure, as best illustrated in FIG. 1, comprises a member spanning the rear end of the vehicle below the bumper and secured at opposite ends thereof to the vehicle frame members shown in phantom at 18.

A moveable hitch member 20, in this instance in the form of a lever, is pivotally mounted on the support member 16 preferably at the center thereof, on suitable pivot means such as a journal member 22 mounted within a suitable bearing member 24 on the support member 16. The moveable lever member 20 is mounted such that it includes the fulcrum thereof intermediate the ends. On the outer end of the moveable member or lever 20 is mounted a ball hitch connector member 26 for receiving a socket hitch connector member 28. The socket hitch connector member 28 is secured such as to a tongue 30 of the towed vehicle 14.

Suitable power means, such as a hydraulic motor 38 of the linear acting type is mounted at one end 40 to the support member 16 or the like, and at the opposite end is pivotally mounted at 42 to the end of the lever 20.

The lever member 20 is mounted and adapted to oscillate to and fro about the pivot means 22 under power from the 38, 28, for moving the hitch connector member 26 back and forth transverse to the longitudinal axis of the towing vehicle 12. This transverse action or movement of the hitch connector member likewise moves the tongue or front end of the towed vehicle or trailer 14 transverse to the axis of the towing vehicle as shown in FIG. 3 and thereby affects a steering of the towed vehicle with respect to the towing vehicle. This eliminates drastic turning of the towing vehicle 12 in order to steer the trailer 14, for example, into a parking space or the like. The degree of steerability of the trailer will depend on the degree or distance to which the hitch connector member 26 can be moved transverse to the center axis of the vehicle 12. Thus the steerability can be increased by increasing the length of the outer arm of the lever 20.

The linear motor 38 is of the double acting hydraulic type with power supplied thereto from a source of pressurized fluid 44 such as a pump and reservoir, supplying fluid by way of a supply line 46 to a control valve 48 which is preferably located adjacent the operator compartment of the vehicle. The valve includes suitable control means such as lever 50 positioned for being easily operated by the vehicle operator while in a position to drive and steer the vehicle 12. Manipulation of the valve 48 by way of control lever or arm 50 directs pressurized fluid into and from the motor 38 along either one of pressure lines 52 and 54 for operating or powering the motor 38 for steering the trailer 14.

Other possible power means are available for operating the hitch, such as electric motors and the like. It will also be appreciated that the device could be operated manually although not as conveniently.

The present arrangement, as illustrated, permits the vehicle operator to manipulate both vehicles 12 and 14 simultaneously by steering the vehicle 12 by its steering system and simultaneously therewith steering the trailer 14 by means of the steerable hitch 10.

Figure 4:
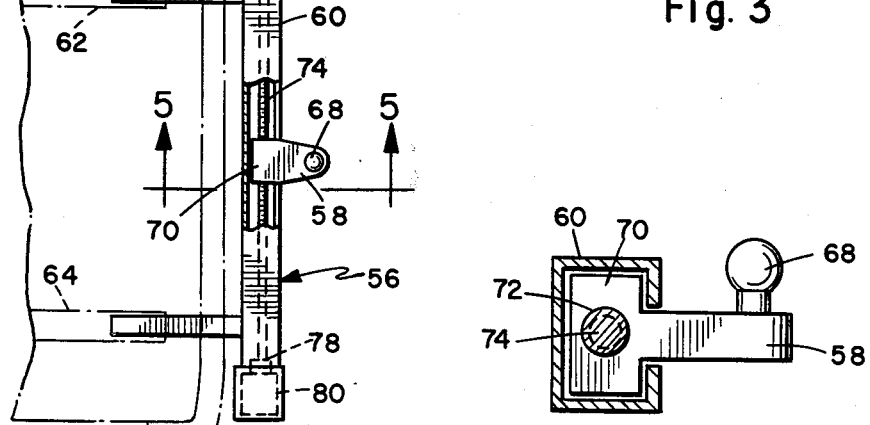
FIG. 4 is a top plan view of the alternate steering mechanism.
Figure 5:
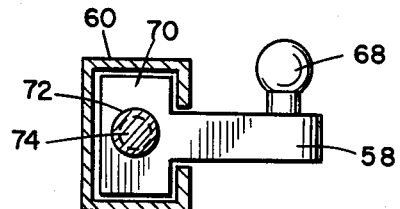
FIG. 5 is an enlarged sectional view taken on line 5—5 of FIG. 4.

Turning now to FIGS. 4 and 5 of the drawing, there is illustrated an alternate embodiment wherein a hitch assembly designated generally by the numeral 56 includes a moveable hitch member 58 moveable mounted on a frame or support member 60, which in turn is secured directly to the frame members 62 and 64 of a towing vehicle 66. The moveable hitch member 58 includes a spherical or ball type hitching connector member 68 for receiving the socket of a hitch member for a towed vehicle. The moveable member 58 is mounted within the support member 60 in a slotted track such as illustrated in FIG. 5. The frame support member 60 has a substantially box-like cross sectional configuration and receives a block like member 70 to which is connected the hitch member 58. The block like member 70 includes a bore 72 in which a screw 74 is threadably mounted. The screw 74 is journaled in suitably spaced journals such as at 76 and 78 within the support member 60. The screw is rotated by a motor illustrated at 80. The motor may be of any suitable type such as electric or hydraulic and is preferably controlled from a remote location, such as the operator station of the vehicle 66.

In this embodiment, powering of the motor 80 rotates screw 74 which in turn moves the hitch member 58 transverse of the axis of the towing vehicle 66 along the track of the support member 60. This action in turn, as in the previous embodiment, moves the tongue or support member of the towed vehicle 14 transverse of the axis of the towing vehicle affecting a steering thereof.

While the present invention has been illustrated and described by means of specific embodiments, it is to be understood that numerous changes and modifications may be made therein without departing from the spirit and scope of the invention as defined in the appended claims.

Having described my invention, I now claim:

1. A trailer towing and steering hitch system adapted for use in combination with passenger vehicles having a frame and a passenger compartment comprising,
   a support frame adapted to be secured to the side rails of the frame of the vehicle and extend outward beneath the bumper at the rear of the vehicle,
   a hitch connector member for pivotally and detachably connecting a trailer to said vehicle;
   a lever pivotally mounted on said support frame and mounting said hitch connector member for movement transverse to the longitudinal axis of said vehicle, and
   power means including a hydraulic motor mounted on said support frame and connected to said lever including control means positioned in the operator compartment for manipulation by an operator of said vehicle for selectively moving said lever member transverse to the longitudinal axis of said towing vehicle for selectively steering the trailer.

2. The system of claim 1, wherein said lever normally extends along the longitudinal axis of the passenger vehicle and is pivotally mounted intermediate the ends thereof on said support frame, said hitch connector member is mounted on one end of the lever, and said hydraulic motor is connected to the other end thereof.

* * * * *